(12) United States Patent
Horne

(10) Patent No.: US 6,501,841 B1
(45) Date of Patent: Dec. 31, 2002

(54) METHOD FOR PROVIDING SECURITY FOR A TRANSMISSION OF INFORMATION THROUGH A PLURALITY OF FREQUENCY ORTHOGONAL SUBCHANNELS

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/216,476

(22) Filed: Dec. 17, 1998

(51) Int. Cl.[7] .............................. H04K 1/04; H04K 1/10; H04J 11/00
(52) U.S. Cl. ............................ 380/38; 380/33; 380/34; 380/262; 370/204; 370/342; 370/343; 455/59
(58) Field of Search .............................. 380/31, 33, 34, 380/38, 260, 261, 262; 370/204, 342, 343, 344; 455/59, 61, 480

(56) References Cited

U.S. PATENT DOCUMENTS 5,412,687 A * 5/1995 Sutton et al. ................ 375/202
5,506,903 A * 4/1996 Yamashita .................... 380/19

FOREIGN PATENT DOCUMENTS

JP          09-322274 A  * 12/1997   ............ H04Q/9/00

OTHER PUBLICATIONS

Translation into English of Mitsubishi Cable Industries Ltd. (Moriwaki et al.), Japanese Patent Application Publication No. 09–322274 A, Dec. 12, 1997, pp. 1–18.*

* cited by examiner

Primary Examiner—Justin T. Darrow
(74) Attorney, Agent, or Firm—Kenneth M. Seddon

(57) ABSTRACT

One embodiment of the present invention is a method for providing security for a transmission of information in an ADSL environment using a DMT modulation technique. The order of the frequency orthogonal subchannels used in the DMT technique is scrambled according to a permutation cipher. The key for this scrambling operation is scrambled with the subscriber's public key, and is encoded according to a CDMA technique for transmission through the ADSL channel approximately concurrently with the information. The encoded key and the DMT data subblocks are recovered from the secured transmission. The encoded key is decoded according to the CDMA technique to generate the decoded key. The decoded key is used to assign an order to the subblocks of data.

14 Claims, 3 Drawing Sheets

METHOD FOR PROVIDING SECURITY FOR A TRANSMISSION OF INFORMATION THROUGH A PLURALITY OF FREQUENCY ORTHOGONAL SUBCHANNELS

FIELD OF THE INVENTION

The invention relates to the field of communication security, and more particularly to the field of security of communications using an orthogonal frequency division technique.

BACKGROUND OF THE INVENTION

One drawback of asymmetrical digital subscriber line (ADSL) technology is that communications using conventional ADSL technology are not private. Typically, all subscribers to a service provider are connected to a single local area network (LAN) at the service provider's central office. Therefore, any transmission between a subscriber and the central office LAN is potentially available to any other subscriber. Using conventional ADSL technology, all local transmissions on a subscriber's LAN are sent to the central office and back to the subscriber's LAN, making even these local transmissions potentially available to other subscribers.

Prior approaches to increasing privacy in an ADSL system include adding switches and routers to the service provider's LAN to segment subscribers' LANs from one another, and adding a router to a subscriber's LAN to restrict local traffic to that LAN. However, these approaches increase the hardware requirements of the ADSL system and provide security only through isolation.

Therefore, a novel approach to providing security for a transmission of information that can be used in an ADSL system has been developed.

SUMMARY OF THE INVENTION

A method for providing security for a transmission of information through a plurality of frequency orthogonal subchannels is disclosed. The information is divided into a plurality of data subblocks. Each data subblock is assigned to one of the frequency orthogonal subchannels using a permutation cipher. A baseband signal representing a key to the permutation cipher is spread over a frequency spectrum for transmission with the information. This frequency spectrum comprises at least two of the frequency orthogonal subchannels.

DETAILED DESCRIPTION OF A PREFERRED EMBODIMENT

A novel approach to providing security for a transmission of information through a plurality of frequency orthogonal subchannels is described. In the following description, specific details are set forth in order to provide a thorough understanding of the present invention. It will be apparent, however, to one skilled in the art that the invention can be practiced without regard to these specific details. In other instances, well known concepts have not been described in particular detail in order to avoid obscuring the present invention.

Figure 1:
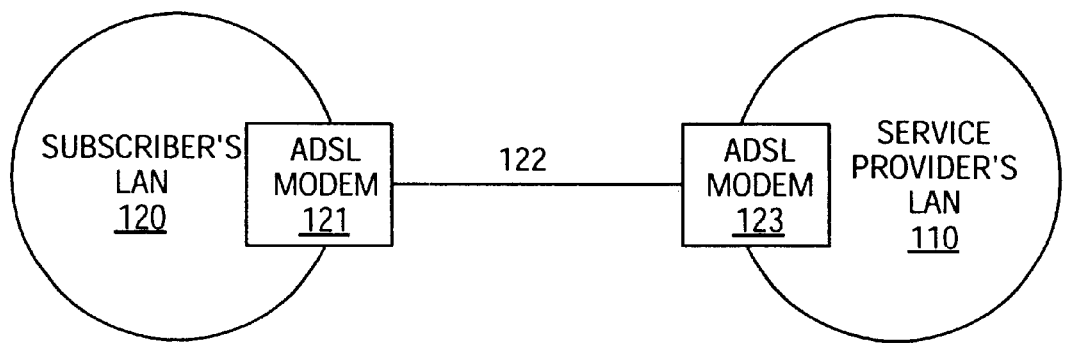
FIG. 1 is a block diagram illustrating an ADSL system.

One embodiment of the present invention is a method for providing security for a transmission of information in an ADSL environment, as illustrated in FIG. 1, using a discrete multitone (DMT) modulation technique. In FIG. 1, a subscriber's LAN 120 is connected to a service provider's LAN 110 through ADSL modem 121, phone line 122, and ADSL modem 123. The order of the frequency orthogonal subchannels used in the DMT technique is scrambled according to a permutation cipher (i.e. a system for encrypting information). The key for this scrambling operation is scrambled with the subscriber's public key, and is encoded according to a code division multiple access (CDMA) technique for transmission through the ADSL channel approximately concurrently with the information so as not to require additional channel bandwidth. The encoded key and the DMT data subblocks are recovered from the secured transmission. The encoded key is decoded according to the CDMA technique to generate the decoded key. The decoded key is used to assign an order to the subblocks of data.

Figure 2:
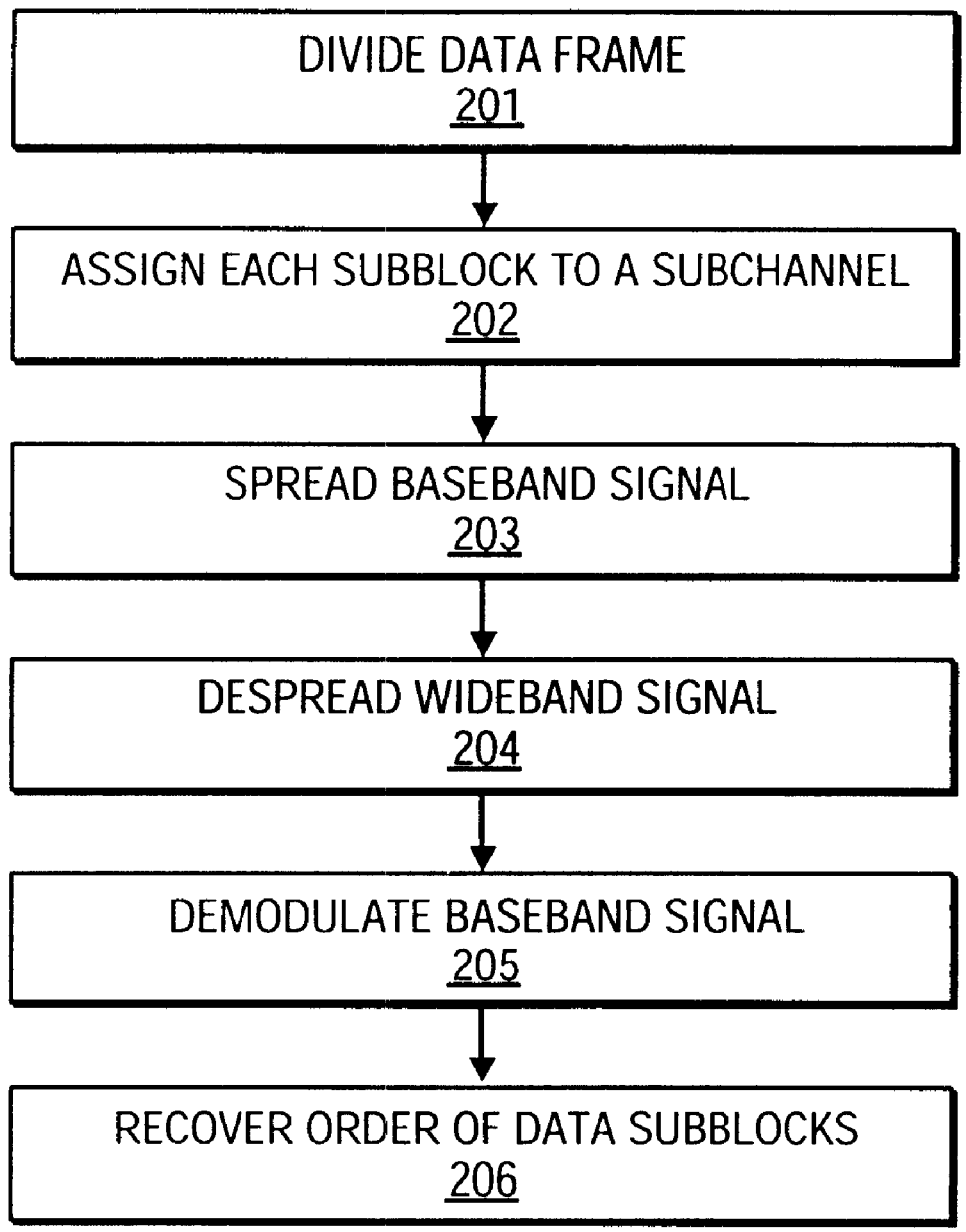
FIG. 2 is a flow chart illustrating a first embodiment of the present invention.

FIG. 2 illustrates one embodiment of the present invention in a method for providing security for a transmission of information through a plurality of frequency orthogonal subchannels. In step 201, the information is divided into a plurality of data subblocks. In step 202, each data subblock is assigned to one of the frequency orthogonal subchannels using a permutation cipher. In step 203, a baseband signal representing a key to the permutation cipher is spread over a frequency spectrum to generate a wideband signal for transmission with the information. This frequency spectrum comprises at least two of the frequency orthogonal subchannels.

In step 204 of FIG. 2, the wideband signal is despread to regenerate the baseband signal. In step 205, the baseband signal is demodulated to regenerate the key to the permuation cipher. In step 206, the key is used to assign an order to the frequency orthogonal subchannels.

Figure 3:
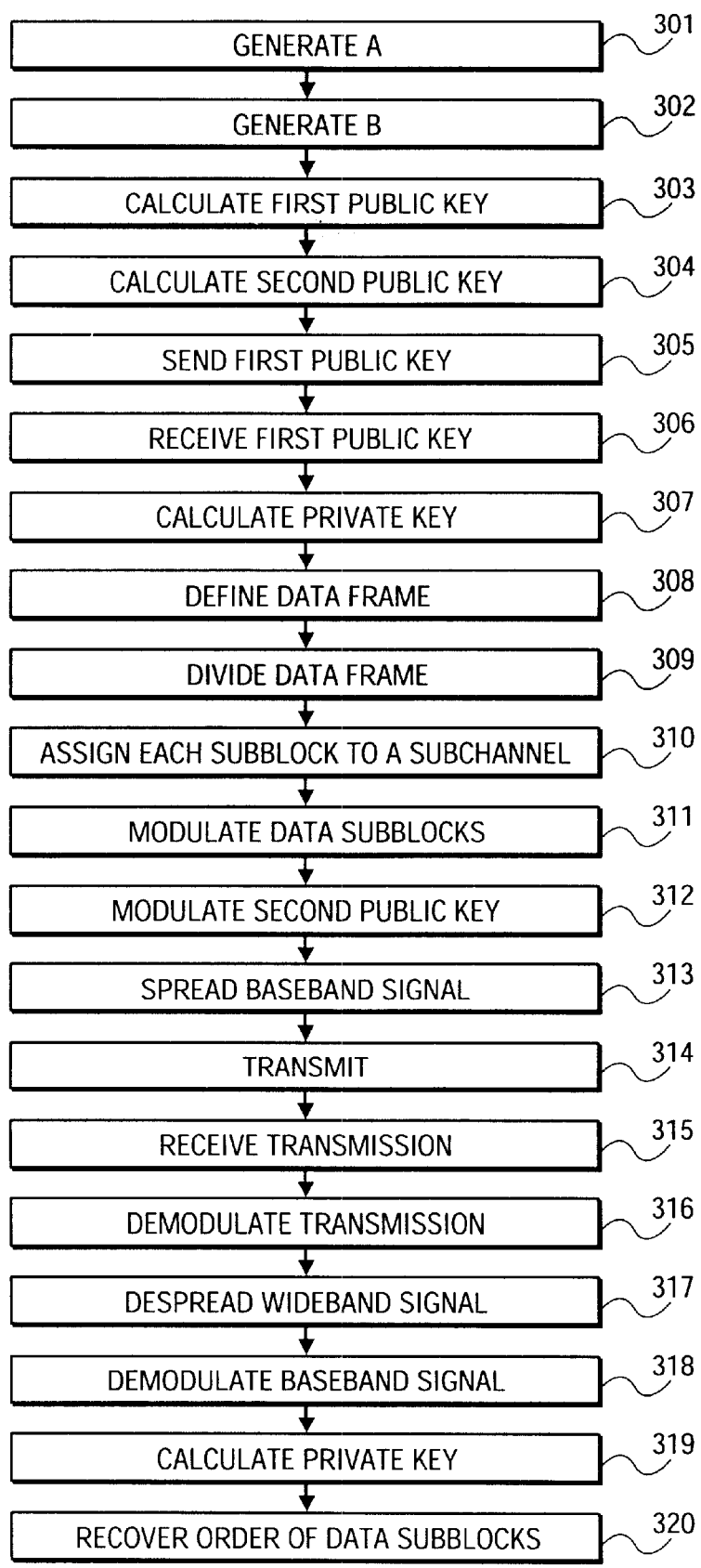
FIG. 3 is a flow chart illustrating a second embodiment of the present invention.

FIG. 3 illustrates another embodiment of the present invention. In the embodiment represented by the flow chart of FIG. 3, information represented by a serial stream of data is to be transmitted from a transmitter to a receiver through an ADSL channel, which is approximately the frequency bandwidth between zero and one megahertz, using a known modulation technique, DMT. However, the invention can be used for information in any digital form, and the invention can by practiced within any frequency bandwidth or with any modulation technique involving orthogonal frequency division. In this embodiment, two levels of security are provided. To provide a first level of security, the DMT subchannel transmission frame is scrambled according to a private key calculated according to an encryption algorithm, the Diffie Hellman algorithm. However, any encryption algorithm or keying system can be used. To provide a second level of security, the subchannel ordering and assignment to carrier frequency is scrambled using a permutation cipher. Either or both encryption steps may be carried out, and either or both keys may be scrambled and sent simultaneous with the data by use of a CDMA overlay channel, which is orthogonal to the data channel.

In the embodiment of FIG. 3, the well known Diffie Hellman algorithm is used to configure or provide both the transmitter and the receiver with a prime number P and another number X. In step 301 of FIG. 3, the receiver generates a random value, 'a', that lies between zero and P minus one. In step 302, the transmitter generates a random value, 'b', that also lies between zero and P minus one. The values of 'a' and 'b' can be generated according to any of a variety of well known techniques for generating random or pseudorandom numbers. In step 303, the receiver calculates a first public key $X^a$ mod P. In step 304, the transmitter calculates a second public key, $X^b$ mod P. In step 305, the receiver sends the first public key to the transmitter. In step 306, the transmitter receives the first public key. In step 307, the transmitter calculates the private key, $X^{ab}$ mod P, based on the first public key by calculating $(X^a$ mod $P)^b$ mod P. Note that in a subsequent step, the transmitter will send the second public key to the receiver, which the receiver will receive and use to calculate the private key. Also note that since any permutation cipher can be used within the scope of the present invention, steps 301 through 307 are optional.

Beginning with step 308, in the embodiment of FIG. 3, the serial stream of data representing the information is processed according to known DMT modulation techniques for ADSL communications, except where otherwise described. Alternatively, other modulation techniques can be used.

In step 308, a data frame is defined from a portion of the datastream. Step 308 is optional since the information can be transmitted in a single transmission within the scope of the present invention. In step 309, the data frame is divided into multiple subblocks, one for each of the frequency orthogonal DMT subchannels.

The data subblocks are initially ordered according to their position in the serial datastream, and the frequency orthogonal subchannels are initially ordered according to their position in the frequency spectrum. In contrast to a conventional approach of assigning each of the data subblocks to a corresponding frequency orthogonal subchannel by matching the initial order of the data subblocks to the initial order of the frequency orthogonal subchannels, the approach of the present invention in step 310 involves using a permutation cipher to assign each data subblock to a corresponding frequency orthogonal subchannel. In one embodiment, the order of the data subblocks is scrambled, and then assigned to the frequency orthogonal subchannels in natural order. In another embodiment, the order of the frequency orthogonal subchannels is scrambled, and then assigned to the data subblocks in natural order. The scrambling of the order of the data subblocks or the frequency orthogonal subchannels can be performed according to any of a variety of known data scrambling techniques.

In step 311, the data from the data subblocks is modulated according to any of a variety of known modulation techniques, such Fast Fourier Transform processing and digital to analog conversion, for transmission through the frequency orthogonal subchannels. In step 312, data representing the second public key is modulated according to any of a variety of known modulation techniques, such as phase shift keying, onto a baseband signal. In step 313, the baseband signal is spread or encoded using a known spread spectrum technique, such as CDMA, over a frequency spectrum including at least two of the frequency orthogonal subchannels for transmission approximately concurrently with the data from the data subblocks. Step 313 results in the generation of a wideband signal representing the second public key.

In step 314, the data from the data subblocks and the wideband signal is transmitted from the transmitter to the receiver through the ADSL channel using any of a variety of known techniques, such as through an unshielded twisted pair cable. In step 315, the transmission is received by the receiver. In steps 316 through 318, the receiver recovers the subblocks of data and the encoded second public key from the transmission.

In step 316, the transmission is demodulated according to the technique used in step 311 to regenerate the data subblocks. In step 317, the wideband signal is despread or decoded according to the technique used in step 313 to regenerate the baseband signal. In step 318, the baseband signal is demodulated according to the technique used in step 312 to regenerate the second public key. In step 319, the receiver calculates the private key based on the second public key. In step 320, the receiver uses the private key to recover the initial order of the data subblocks by assigning an order to either the data subblocks or the frequency orthogonal channels, depending on the technique used in step 310. Note that step 319 is optional since any permutation cipher can be used within the scope of the present invention.

Steps 301 through 320 are repeated until all of the information has been transmitted and received. In this embodiment, a new value of 'a' is generated each time step 301 is repeated, and a new value of 'b' is generated each time step 302 is repeated. Alternatively, the generated values of 'a' and 'b' can be reused for multiple iterations.

The present invention can also be embodied in a machine-readable medium, such as a memory, a storage device, or a transmission medium, having stored thereon data representing a sequence of instructions. This sequence of instructions, when executed by a processor, causes the processor to execute a portion of the steps of the method illustrated in FIG. 2, the method illustrated in FIG. 3, or any other method that embodies the present invention. The processor can be integrated into a transmitter for transmitting the information, a receiver for receiving the information, any other component, or can be a discrete component.

Thus, exemplary embodiments of the present invention-have been described. However, the present invention is not limited to these embodiments or any of the details described. For example, the invention could be practiced with the steps of FIG. 2 or 3 performed in a different sequence. The specification and drawings must be regarded in an illustrative rather than a restrictive sense. The scope of the present invention is defined by the following claims.

What is claimed is:

1. A method for providing security for a transmission of information through a plurality of frequency orthogonal subchannels comprising steps of:

dividing the information into a plurality of data subblocks;

assigning each data subblock to one of the frequency orthogonal subchannels using a permutation cipher; and spreading a baseband signal representing a first key to the permutation cipher over a frequency spectrum comprising at least two of the frequency orthogonal subchannels for transmission with the information.

2. The method of claim 1 further comprising a step of transmitting the information and the baseband signal approximately concurrently.

3. The method of claim 1 further comprising steps of:

receiving a second key to the permutation cipher; and calculating a third key based on the second key, wherein the third key is used in the step of assigning each data subblock to one of the frequency orthogonal subchannels.

4. A method for providing security for a transmission of information through a plurality of frequency orthogonal subchannels in an asymmetrical digital subscriber line (ADSL) channel comprising steps of:

assigning a scrambled order to the frequency orthogonal subchannels using a permutation cipher;

modulating the information according to a discrete multitone technique; and encoding a first key to the permutation cipher according to a code division multiple access technique for transmission through the ADSL channel with the information.

5. The method of claim 4 further comprising a step of transmitting the information and the first key approximately concurrently.

6. The method of claim 4 further comprising steps of:

receiving a second key to the permutation cipher; and calculating a third key based on the second key, wherein the third key is used in the step of assigning a scrambled order to the frequency orthogonal subchannels.

7. A method for providing security for a transmission of information through a plurality of frequency orthogonal subchannels comprising steps of:

(A) dividing the information into a plurality of frames;

(B) dividing a frame of information into a plurality of data subblocks;

(C) assigning each data subblock to one of the frequency orthogonal subchannels using a permutation cipher;

(D) spreading a baseband signal representing a first key to the permutation cipher over a frequency spectrum comprising at least two of the frequency orthogonal subchannels for transmission with the information;

(E) transmitting the frame of information and the first key approximately concurrently; and (F) repeating steps (B) to (E) until the information has been transmitted.

8. The method of claim 7 further comprising steps of:

(A1) receiving a second key to the permutation cipher; and (A2) calculating a third key based on the second key, wherein the third key is used in the step of assigning each data subblock to one of the frequency orthogonal subchannels.

9. A method for providing security for a transmission of information through a plurality of frequency orthogonal subchannels in an asymmetrical digital subscriber line (ADSL) channel comprising steps of:

(A) dividing the information into a plurality of frames;

(B) assigning a scrambled order to the frequency orthogonal subchannels using a permutation cipher;

(C) modulating a frame of information according to a discrete multitone technique;

(D) encoding a first key to the permutation cipher according to a code division multiple access technique for transmission through the ADSL channel with the information;

(E) transmitting the frame of information and the first key approximately concurrently; and (F) repeating steps (B) to (E) until the information has been transmitted.

10. The method of claim 9 further comprising steps of:

(A1) receiving a second key to the permutation cipher; and (A2) calculating a third key based on the second key, wherein the third key is used in the step of assigning a scrambled order to the frequency orthogonal subchannels.

11. A machine-readable medium having stored thereon data representing a sequence of instructions for providing security for a transmission of information through a plurality of frequency orthogonal subchannels, wherein the sequence of instructions, when executed by a processor, causes the processor to perform steps of:

dividing the information into a plurality of data subblocks;

assigning each data subblock to one of the frequency orthogonal subchannels using a permutation cipher; and spreading a baseband signal representing a first key to the permutation cipher over a frequency spectrum comprising at least two of the frequency orthogonal subchannels for transmission with the information.

12. The machine-readable medium of claim 11 wherein the sequence of instructions, when executed by a processor, further causes the processor to perform a step of calculating a second key to the permutation cipher to be used in the step of assigning each data subblock to one of the frequency orthogonal subchannels.

13. A machine-readable medium having stored thereon data representing a sequence of instructions for providing security for a transmission of information through a plurality of frequency orthogonal subchannelsin an asymemetrical digital subscriber line (ADSL) channel, wherein the sequence of instructions, when executed by a processor, causes the processor to perform steps of:

assigning a scrambled order to the frequency orthogonal subchannels using a permutation cipher;

modulating the information according to a discrete multitone technique; and encoding a first key to the permutation cipher according to a code division multiple access technique for transmission through the ADSL channel with the information.

14. The machine-readable medium of claim 13 wherein the sequence of instructions, when executed by a processor, further causes the processor to perform a step of calculating a second key to the permutation cipher to be used in the step of assigning a scrambled order to the frequency orthogonal subchannels.

\* \* \* \* \*